United States Patent [19]

Hashino et al.

[11] Patent Number: 5,746,304
[45] Date of Patent: May 5, 1998

[54] SPEED INCREASING AND ACCUMULATING CONVEYOR CHAIN

[75] Inventors: Michiya Hashino, Longmeadow; James G. Lamoureux, Springfield, both of Mass.; Shinichi Fukushima, Daito, Japan; Katsutoshi Shibayama, Higashiosaka, Japan; Yoshihiro Murakami, Yao, Japan; Sachio Hayashi, Toyonaka, Japan

[73] Assignee: Tsubakimoto Chain Co., Osaka-Fu, Japan

[21] Appl. No.: 561,177

[22] Filed: Nov. 20, 1995

[51] Int. Cl.$^6$ .................................. B65G 13/06
[52] U.S. Cl. ............... 198/781.02; 198/781.04; 198/781.08; 198/851
[58] Field of Search ............ 198/781.02, 781.04, 198/781.08, 784, 792, 850, 851

[56] References Cited

U.S. PATENT DOCUMENTS

| | | | |
|---|---|---|---|
| 4,238,029 | 12/1980 | Pirro, Jr. | 198/781.08 X |
| 4,505,381 | 3/1985 | Major | 198/781.02 |
| 4,765,455 | 8/1988 | Matsuno et al. | 198/851 X |
| 5,161,673 | 11/1992 | Cairns | 198/781.04 |

*Primary Examiner*—James R. Bidwell
*Attorney, Agent, or Firm*—Armstrong, Westerman, Hattori, McLeland & Naughton

[57] ABSTRACT

The speed increasing and accumulating conveyor chain of the present invention can convey a conveyed object faster than the running speed of the chain, and keep the conveyed object stopped while continuously running the chain itself. The load roller with a larger diameter and the running roller with a smaller diameter are coaxially and rotatably mounted on the connecting pin, which is secured to the link plate, respectively. The frictional material is mounted on the load surface of the load roller, wherein the frictional material provides the load surface of the load roller with a larger frictional force than that of rotatable surface between the load roller and the running roller.

4 Claims, 3 Drawing Sheets

5,746,304

1

SPEED INCREASING AND ACCUMULATING CONVEYOR CHAIN

FIELD OF THE INVENTION

The present invention relates to a speed increasing and accumulating conveyor chain, which can convey a conveyed object faster than the running speed of a chain ("speed increasing"), and keep the conveyed object stopped while continuously running the chain itself ("accumulating").

BACKGROUND OF THE INVENTION

FIG. 5 shows the conveyor chain, which is disclosed in Japanese Unexamined Utility Model Publication No. Hei 5-11212. A chain 60 of this kind includes a connecting pin 64 for connecting a pair of link plates 62, a load roller 66 having a large diameter and a running roller 68 having a small diameter, wherein the load roller 66 and the running roller 68 are coaxially and rotatably mounted on the connecting pin 64, respectively. The chain 60 functions not only to increase the speed of the conveyed object but also to accumulate the conveyed object. That is, when conveying at an increased speed, the running roller 68 rolling on the rail, due to the frictional force of a rotatable abutting surface 70 between the load roller 66 and the running roller 68, gradually provides the load roller 68 with a rotational driving force, thereby conveying the conveyed object faster than the running speed of the chain 60. On the other hand, when accumulating, i.e., the conveyed object stops by abutting against a stopper, or similar device, the load roller 66 rotates reversely with respect to the running roller 68 rotating on the rail, thereby enabling the conveyed object to stop at a predetermined position.

In the chain of this kind, because a number of running rollers 68 and load rollers 66 are arranged in the longitudinal direction of the chain 60, when the coefficient of friction of the rotatable abutting surface 70 is large, the tractive force of the chain 60 increases, thereby remarkably degrading efficiency thereof. For this reason, materials of both the running roller 68 and the load roller 66 are selected such that the coefficient of friction of the rotatable abutting surface 70 is lessened.

However, as the coefficient of friction of the rotatable abutting surface 70 decreases, the coefficient of friction between the load roller 66 and the conveyed object, and the coefficient of friction between the running roller 68 and the rail would decrease, so that the load roller 66 and the running roller 68 are towed by the chain 60 without rotating at all. Accordingly, the load roller 66 slides on the undersurface of the conveyed object during accumulation as well as during start-up of the chain, thereby causing problems in that the conveyed object is injured and the running roller 68 becomes worn by sliding on the rail.

SUMMARY OF THE INVENTION

It is an object of the present invention to provide a speed increasing and accumulating conveyor chain, which prevents the load roller from sliding on the undersurface of the conveyed object so that the conveyed object can be effectively protected from harm.

The present invention solves the above-mentioned problems. To attain the foregoing, the speed increasing and accumulating conveyor chain, according to the present invention, basically includes: link plates; a connecting pin secured to the link plates therebetween; a load roller having

2 a large diameter portion and a load surface for loading a conveyed object formed at an outer surface thereof; a running roller having a small diameter; the load roller and the running roller being rotatably and coaxially mounted on the connecting pin and abutting each other at a portion other than the large diameter portion of the load roller to form a rotatable abutting surface therebetween; and a frictional material mounted on the load surface of the load roller, wherein the frictional material enables the load surface to generate a larger frictional force than that of said rotatable abutting surface.

When the chain is started, the running roller rolls on the rail and gives the load roller, through the rotatable abutting surface therebetween, a rotational driving force in the same rotational direction as the running roller. According to the present invention, because a frictional material, which provides a high frictional force, is mounted on the load surface of the load roller, the rotation of the load roller is controlled by the frictional force generated on the load surface thereof.

After the start-up of the chain, the load roller has a difference in angular velocity relative to the running roller. However, the difference therebetween is gradually diminished by the action of the small frictional force of the rotational abutting surface. When the conveying speed of the conveyed object exceeds the chain speed in the course of the gradual decrease in the difference of the relative angular velocity and then comes to a state where the load roller and the running roller rotate at the same angular velocity, the conveyed object is made to move faster than the chain and thereafter maintains a predetermined maximum speed. During that period, because the conveyed object is accelerated without sliding on the load surface, the conveyed object can reach the maximum speed smoothly and rapidly.

On the other hand, during accumulation when the conveyed object is prevented from moving by abutting against stopper, or the like, the running roller keeps rolling on the rail, while the conveyed load roller, without rotating in association with the running roller, rolls on the undersurface of the conveyed object in the opposite direction of the running roller by means of the high frictional force of the frictional material, with the result that the drag of the load roller on the load surface is effectively prevented.

Further, a similar problem arises at an abutting surface between the running roller and the rail, as well. Accordingly, it is preferable that a frictional material, which provides a higher frictional force than that of the rotational abutting surface between the load roller and the running roller, be mounted on a running surface of the running roller so as not to rotate the running roller in association with the load roller, thereby enabling the running roller to roll on the rail.

DETAILED DESCRIPTION OF THE PREFERRED EMBODIMENT

Figure 1:
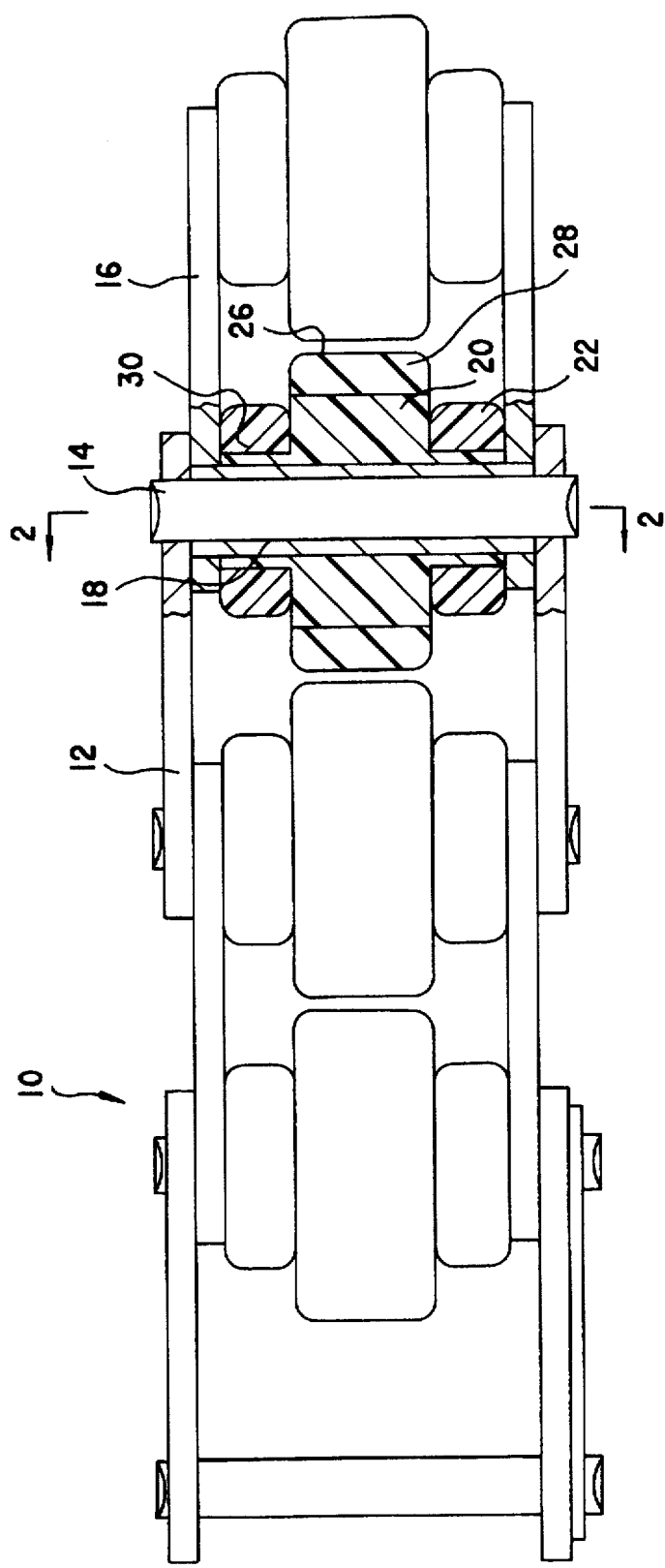
FIG. 1 is a plan view of one embodiment of the speed increasing and accumulating conveyor chain according to the present invention.
Figure 2:
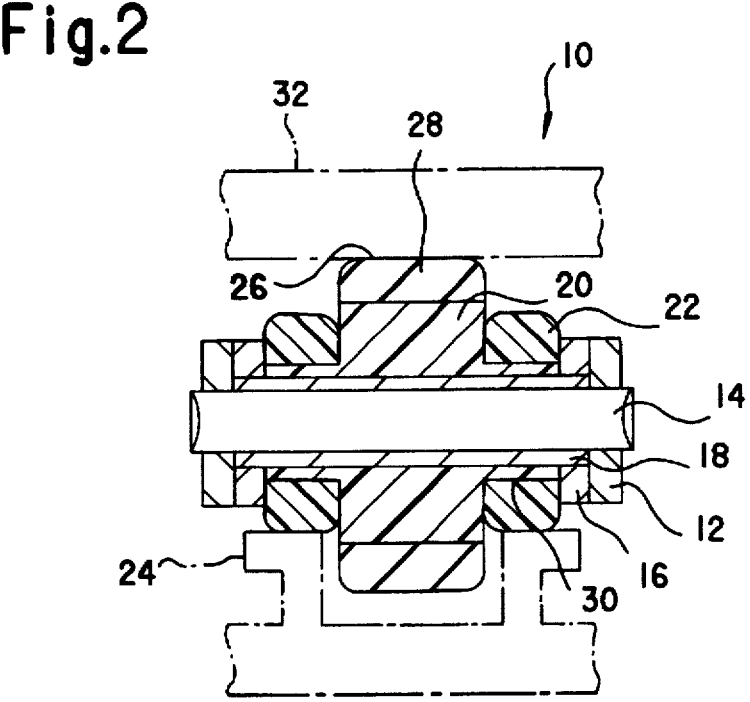
FIG. 2 is a cross sectional view of the speed increasing and accumulating conveyor chain taken along line 2—2 of FIG. 1.

FIG. 1 and FIG. 2 show one embodiment of a speed increasing and accumulating conveyor chain according to the present invention. FIG. 1 is a plan view of the speed increasing and accumulating conveyor chain and FIG. 2 is a cross sectional view of the same taken along line 2—2 of FIG. 1. The speed increasing and accumulating conveyor chain 10, according to the first embodiment of the present invention, includes a connecting pin 14 press fitted to a pair of outer link plates 12, a bushing 18 press fitted to a pair of inner link plates 16 and loosely fitted around the connecting pin 14, a load roller 20 having a large diameter portion and a running roller 22 having a small diameter, wherein the bushing 18, the load roller 20 and the running roller 22 are coaxially fitted around the connecting pin 14. When the chain 10 is towed, the running roller 22 rolls on the rail 24, and a rotational driving force is transmitted from the running roller 22 to the load roller 20 through a rotatable abutting surface 30.

The load roller 20 includes a ring-shaped frictional material 28 formed on the load surface 26 for loading a conveyed object 32. The frictional material 28 is mounted on the load surface 26 by means of, such as adhesive bonding, press fitting or integral forming. The running roller 22 and the load roller 20 are made of polyacetal resin, respectively, while the frictional material 28 of the load roller 20 is made of urethane rubber. The important thing is to set up the coefficient of friction of the load surface 26 to be larger than that of the rotatable abutting surface 30, with the result that, even if there exists a difference in angular velocity between the running roller 22 and the load roller 20, the load roller 20 surely comes in rolling contact with the conveyed object 32, without sliding with respect thereto.

In actual operation of the speed increasing and accumulating conveyor chain of the present invention, when starting the chain 10 and conveying the conveyed object 32 at an increased speed, the load roller 20 gradually receives the rotational driving force from the running roller 22, without sliding relative to the conveyed object 32, thereby enabling the conveyed object 32 to accelerate to the maximum speed smoothly in the shortest time. In the prior art, the load roller sometimes slides on the undersurface of the conveyed object when the chain is towed. However, the speed increasing and accumulating conveyor chain according to the present invention has no such problem.

Further, during accumulation, the load roller 20 receives the rotational driving forces simultaneously from the conveyed object 32 and from the running roller 22, both of which are oriented in the opposite direction from each other. However, the rotation of the load roller 20 is controlled by the conveyed object 32 because the coefficient of friction of the load surface 30 is larger than that of the rotatable abutting surface 30, so that the load roller 20 cannot be dragged by the chain 10 while the load roller 20 is stopped, nor the rotation of the load roller 20 cannot be controlled by the running roller 22.

As will be understood from the foregoing, according to the conveyor chain 10 of the present invention, there are obtained excellent effects in that the conveyed object 32 can be effectively protected, the sliding noise between the conveyed object 32 and the load roller 20 can be reduced, and even a soft conveyed object can be placed directly on the load roller 20 without using a pallet or similar.

Figure 3:
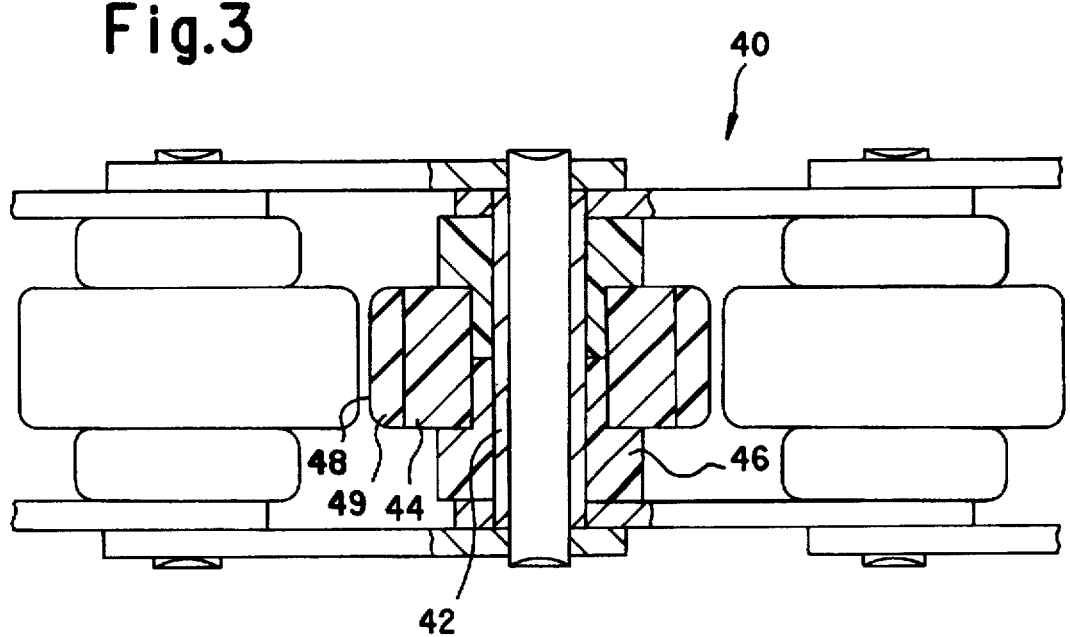
FIG. 3 is a plan view of another embodiment of the speed and accumulating conveyor chain according to the present invention.

FIG. 3 shows a second embodiment of a speed increasing and accumulating conveyor chain according to the present invention. In the speed increasing and accumulating conveyor chain 40, according to the second embodiment of the present invention, a pair of running rollers 46 is loosely fitted around a bushing 42, while a load roller 44 is loosely fitted into the outer recess portion formed on the outer peripheral surface of the running roller 46. Like in the first embodiment, the load roller 44 includes a ring-shaped frictional material 49, made of urethane rubber, which provides a high frictional force and which is mounted on the load surface 48 thereof.

Figure 4:
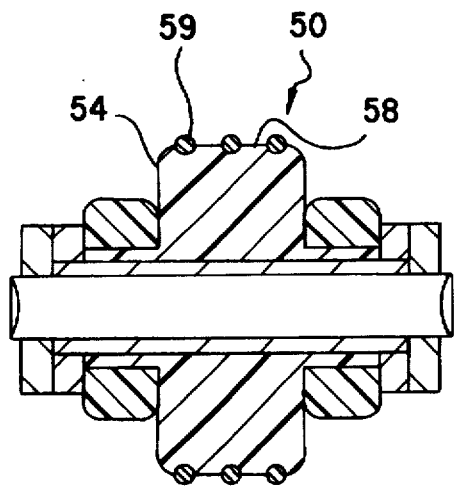
FIG. 4 is a plan view of yet another embodiment of the speed increasing and accumulating conveyor chain according to the present invention.
Figure 5:
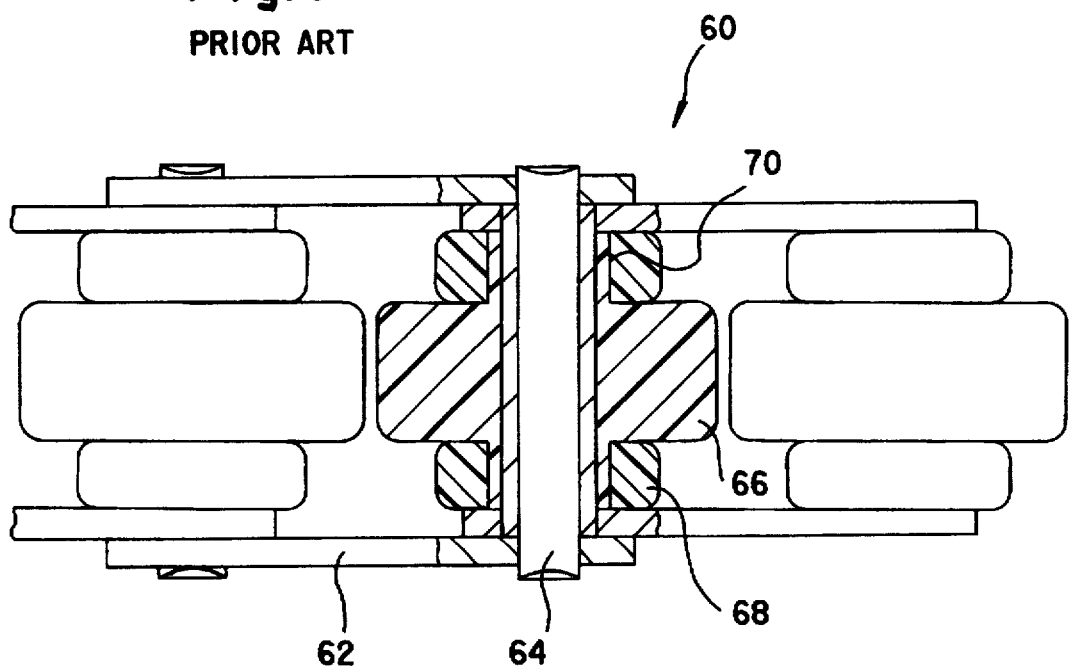
FIG. 5 is a plan view of the prior art speed increasing and accumulating conveyor chain.

The frictional material is not limited to an integrated ring-shaped member, as described in the foregoing illustrated example, but the frictional material may be composed separately, scattered on the load surface or disposed at regular intervals. Further, as shown in FIG. 4, an O-ring of conventional form, for example, may be used as a frictional material 59 such that the O-ring is wound around the load surface 58 of the load roller 54 to constitute the speed increasing and accumulating conveyor chain 50 of the present invention.

Furthermore, the frictional material made of, for example, an urethane rubber, may be adhered to the rolling surface of the running roller, thereby preventing the running roller from sliding on the rail and reducing noise and wear of the running roller.

As will be understood from the foregoing, in the speed increasing and accumulating conveyor chain, according to the present invention, because the frictional material is mounted on the load surface of the load roller, wherein the frictional material provides the load surface with a larger frictional force than that of the rotatable abutting surface between the load roller and the running roller, during start-up, the load roller is prevented from sliding relative to the conveyed object, thereby enabling the conveyed object to accelerate smoothly and rapidly, during accumulation, the load roller surely rolls relative to the conveyed object, without rotating in association with the running roller, thereby preventing the conveyed object from being harmed.

Accordingly, in the prior art mentioned above, the attachment for holding a conveyed object, such as a pallet, must be used when conveying a soft conveyed object. However, according to the present invention, which prevents the conveyed object from sliding relative to the load roller, even such a soft conveyed object can be conveyed at an increased speed, with the conveyed object placed directly on the load roller of the chain, and be effectively accumulated thereon, thereby enabling the speed increasing and accumulating conveyor chain of the present invention to be extremely practical.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A speed increasing and accumulating conveyor chain, comprising:
    link plates;
    a connecting pin extending between and being secured at its opposite ends to said link plates;
    a load roller having a large diameter portion and a load surface for supporting a conveyed object formed at an outer peripheral surface of said large diameter portion;
    at least one running roller disposed in axially spaced relation with respect to said load roller and having a diameter smaller than that of said large diameter portion of said load roller;

said load roller and said at least one running roller being rotatably and coaxially mounted on said connecting pin in abutting relation with each other at a portion other than said large diameter portion of said load roller to form mutually rotatable abutting surfaces therebetween; and a frictional material having a coefficient of friction with respect to said conveyed object which is greater than a coefficient of friction between said load roller and said running roller, wherein said frictional material enables the load surface of said load roller to generate a larger frictional force on said conveyed object than said rotatable abutting surface of said load roller generates on the abutting surface of said running roller.

2. A speed increasing and accumulating conveyor chain according to claim 1 in which said frictional material is made of resilient rubber, thereby preventing the conveyed article from damage when resting on said frictional material.

3. A speed increasing and accumulating conveyor chain according to claim 1 in which said load roller and said running roller are made of polyacetal resin, and said frictional material is made of urethane rubber.

4. A speed increasing and accumulating conveyor chain according to claim 1 in which a frictional material is mounted on the running roller, thereby preventing said running roller from sliding on a rail and reducing noise and wear of said running roller.

* * * * *

UNITED STATES PATENT AND TRADEMARK OFFICE
CERTIFICATE OF CORRECTION

PATENT NO.: 5,746,304
DATED : May 5, 1998
INVENTOR(S): Michiya HASHINO, et al.

It is certified that error appears in the above-identified patent and that said Letters Patent is hereby corrected as shown below:

On the title page item [73],
First Assignee should be listed as follows:

U.S. Tsubaki, Inc., Wheeling, Illinois

Signed and Sealed this

Fifteenth Day of May, 2001

NICHOLAS P. GODICI

Attest:

Attesting Officer

Acting Director of the United States Patent and Trademark Office